US00RE34953E

United States Patent [19]

Denney et al.

[11] E Patent Number: Re. 34,953

[45] Reissued Date of Patent: May 30, 1995

[54] TAKEOUT JAW INSERT AND ASSEMBLY

[75] Inventors: Michael L. Denney, Denton; Shelby M. Withrow, Paradise; John M. DeLancey, Sr., Fort Worth, all of Tex.

[73] Assignee: Union Oil Company of California, Los Angeles, Calif.

[21] Appl. No.: 979,241

[22] Filed: Nov. 20, 1992

Related U.S. Patent Documents

Reissue of:

[64] Patent No.: 4,995,896
Issued: Feb. 26, 1991
Appl. No.: 401,038
Filed: Aug. 31, 1989

[51] Int. Cl.[6] ..... C03B 9/44

[52] U.S. Cl. ..... 65/260; 65/172; 65/374.15; 294/86.4; 294/902; 269/286; 269/268; 269/284; 269/283

[58] Field of Search ..... 65/260, 172, 374.15, 65/173; 294/86.4, 902; 269/286, 268, 284, 283, 908

[56] References Cited

U.S. PATENT DOCUMENTS

| | | | |
|---|---|---|---|
| 1,436,825 | 11/1922 | Sanford | 65/375.14 X |
| 2,100,497 | 11/1937 | White | 294/902 |
| 2,841,403 | 7/1958 | Klein et al. | 269/268 X |
| 3,655,233 | 4/1972 | Twist | 294/902 |
| 3,790,205 | 2/1974 | Wenz . | |
| 3,938,847 | 2/1976 | Peyton | 294/87.24 |
| 4,298,373 | 11/1981 | Mumford et al. | 65/260 |
| 4,973,823 | 11/1990 | Benway et al. | 269/268 X |

FOREIGN PATENT DOCUMENTS

| | | | |
|---|---|---|---|
| 1481757 | 3/1969 | Germany | 294/87.24 |
| 2501660 | 7/1976 | Germany | 65/374.15 |
| 2722689 | 11/1978 | Germany | 294/902 |
| 0058233 | 5/1981 | Japan | 269/908 |
| 544207 | 4/1942 | United Kingdom | 294/902 |
| 2126211 | 3/1984 | United Kingdom . | |
| 0854709 | 8/1981 | U.S.S.R. | 294/902 |
| 1006209 | 3/1983 | U.S.S.R. | 294/902 |

*Primary Examiner*—Karen M. Hastings
*Assistant Examiner*—John Hoffman
*Attorney, Agent, or Firm*—Charles L. Hartman; Gregory F. Wirzbicki

[57] ABSTRACT

A takeout jaw *assembly* for use in a bottle-forming machine [is formed in a semicircular shape and] contains a spring clip for holding immovably [a piece of] *an arcuate,* non-metallic [contact material] *takeout jaw insert* within [a] *an arcuate* pocket in the body of the takeout jaw.

38 Claims, 3 Drawing Sheets

FIG. 5
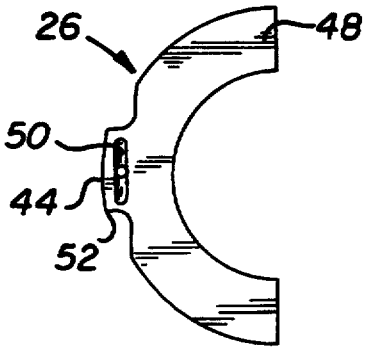
FIG. 6
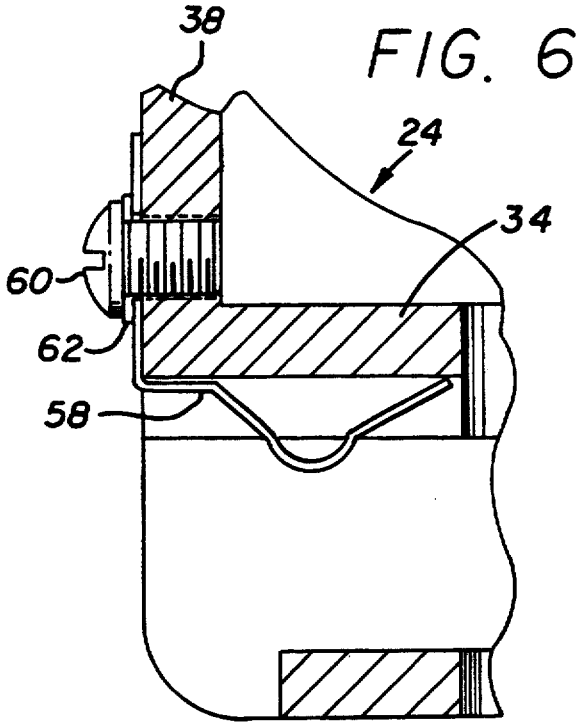
FIG. 7
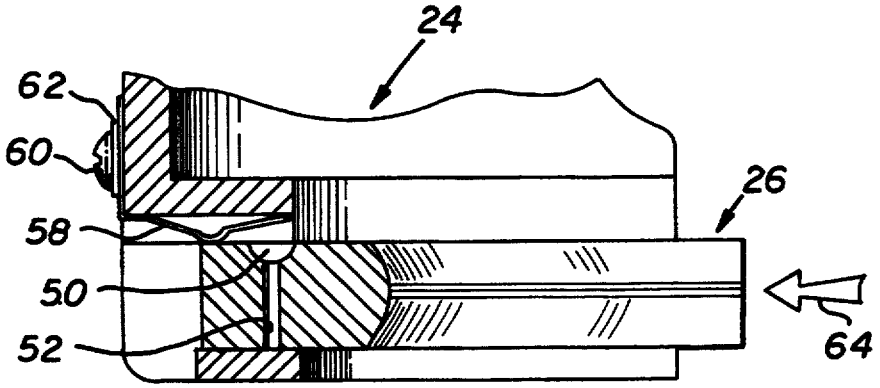
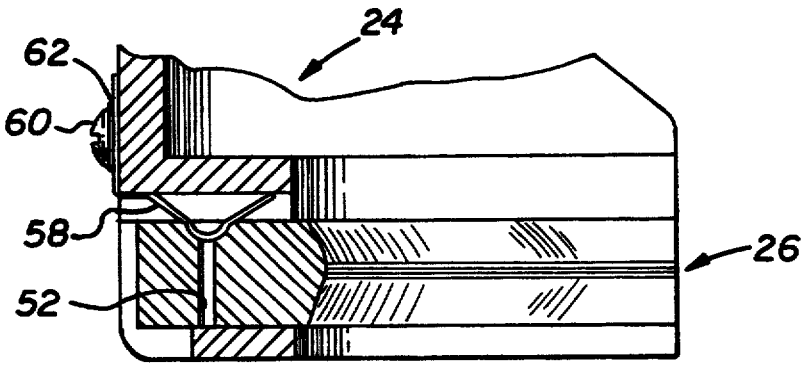
FIG. 8

TAKEOUT JAW INSERT AND ASSEMBLY

Matter enclosed in heavy brackets [ ] appears in the original patent but forms no part of this reissue specification; matter printed in italics indicates the additions made by reissue.

FIELD OF THE INVENTION

This invention relates to the field of glassmaking. In one of its more particular aspects, this invention relates to a fixture for use in a machine for lifting hot glass bottles from the molds in which they are formed. In another of its more particular aspects, this invention relates to the combination of such a fixture and a non-metallic contact material especially adapted for use in the fixture.

BACKGROUND OF THE INVENTION

Hot glass, especially when formed into various shapes in the manufacture of glass containers such as bottles, is susceptible to being damaged by contact with glass processing equipment. Most of the equipment with which hot glass comes in contact in the hot end process area during the manufacture of glass bottles is fabricated from metallic materials such as stainless steel and other alloys. However, in certain areas of the hot end processing of glass bottles, it has been found desirable to utilize non-metallic materials such as graphite, asbestos, plastics or carbon fibers.

One such application is in fixtures used to lift hot newly formed bottles from the mold in which they are formed and set them down on an air pad for cooling before being conveyed to the annealing furnace. These fixtures are called takeout jaws or tongs. Since metallic takeout jaws may cause scratching or checking by contact with the hot formed bottles, takeout jaws are frequently fabricated with a non-metallic insert for contacting the hot glass. Checking, which is the formation of imperceptible cracks due to sudden localized heat transfer or thermal shock, can be, thereby, largely prevented and scratching is minimized. This is particularly important in the current production of lighter weight, more fragile bottles which require gentler handling.

Of the materials which have been used as inserts for takeout jaws, the most satisfactory to date has proven to be graphite. Although other non-metallic materials have been used, most such non-metallic materials are not completely suitable for use in lifting the hot containers from the molds. Asbestos, which was used at one time, has proved to be undesirable for safety and environmental reasons. Plastics suitable for use at the high temperatures encountered in the hot end process area must be specially formulated and yet have a relatively short service life. Graphite has been found to possess properties which are particularly adapted for contacting hot glass containers including high strength, resistance to oxidation, non abrasive surface integrity, heat resistance, low porosity and long service life.

One of the disadvantages of the takeout jaws previously available was the frequent need to replace worn parts during the course of use in the bottle-forming machine. This wear was caused largely by the movement of takeout jaw inserts within the jaw. Inserts were commonly held in position by steel detent balls positioned in holes in the takeout jaws. Detent balls were subject to wear and fouling due to the accumulation of grease, oil and foreign matter. The detent balls could hang up in their holes permitting the insert to fall out, causing loss of the insert and loss of production. Detent balls seldom provided tight enough fits of the insert to render the insert immovable within the jaw. Some degree of play between the insert and jaw was therefore almost always present.

Coupled with the fact that jaws having close tolerances could not be readily fabricated from east bronze, the form of takeout jaws conventionally manufactured, the play between the jaw and insert resulted in wear of the insert, necessitating frequent replacement thereof. In most instances, because of the lack of close tolerances in the takeout jaws, replacement of both inserts from a pair of takeout jaws was necessary.

It would, therefore, be desirable to provide takeout jaws which reduce the wear on inserts and in which the inserts can be readily replaced in the event of wear or damage without having to replace parts of the jaws themselves.

SUMMARY OF THE INVENTION

The present invention provides takeout jaws which are designed to hold a piece of non-metallic contact material under spring tension in a manner such that the contact material does not move within the takeout jaws upon contacting a hot glass container. Because the contact material is held securely in position by spring tension, it is possible to lift the hot containers in a manner such that damage to the containers is minimized. Whereas takeout jaws which were previously used permitted a certain amount of movement of the inserts within the takeout jaws, the takeout jaws of the present invention do not permit such movement. Thus, the takeout jaws can be machined to close tolerances enabling the container lifting machine to operate as a precision machine. Because of the resulting gentle handling of the hot containers, it has become feasible to produce lighter weight glass containers and to increase the efficiency and hence the output.

A takeout jaw of the present invention comprises a generally arcuate holder for an arcuate piece of nonmetallic contact material, means at the middle of the arc formed by said arcuate holder for holding said arcuate piece immovably within said arcuate holder, and means integral with said holder for attaching the jaw to a support therefor.

The takeout jaws of the present invention permit higher bottle yields and decrease the need for replacement of the contact material inserts.

BRIEF DESCRIPTION OF THE DRAWINGS

The invention will be more readily understood by reference to the accompanying drawings wherein like numerals refer to like elements and in which:

FIG. 5 is a plan view of an insert of the present invention.

FIG. 6 is a greatly enlarged cross-section of a portion of a takeout jaw of the present invention show the spring in its untensioned condition.

FIG. 7 is an enlarged cross-section of a portion of a takeout jaw and partially mated insert showing the spring in its fully tensioned condition.

FIG. 8 is an enlarged cross-section of a portion of a takeout jaw and fully mated insert showing the spring in its untensioned condition.

DESCRIPTION OF THE PREFERRED EMBODIMENT

The takeout jaws of the present invention permit higher bottle yields, are economically producible in small quantities and are characterized by decreased need for replacement of inserts.

The design of the takeout jaw of the present invention permits machining to close tolerances, thereby ensuring accurate and precise set up on the bottle forming machine. The precision machining of the takeout jaws combined with the tightness of the insert in the pocket of the jaw which contains the insert enables the takeout jaws to be accurately located on the bottle, in a reproducible manner, thereby reducing deformation of the bottle finish, that is, the top of the bottle, due to misalignment and consequently the number of bottles which must be scrapped. If desired, where threaded finishes are produced, the inserts can be designed to contact the threaded finish only at the root and on the underside of the threads to further decrease the likelihood of damage.

The machine fabrication of the takeout jaws of the present invention eliminates the high cost of tooling of the cast takeout jaws of the prior art and enables economic production even in relatively small quantities. Whereas the cast bronze takeout jaws of the prior an had to be manufactured in quantities of thousands of units to justify the high initial cost of tooling, the machined takeout jaws of the present invention can be manufactured economically in quantities as low as hundreds of units. Furthermore, the arcuate or semicircular shape of the takeout jaws of the present invention lends itself to being turned on a lathe. In addition, the number of pans required for the spring clip which retains the insert within a semicircular pocket in the takeout jaw is three, including spring, bolt and washer, for each takeout jaw compared to eight for the detent ball retainer, which requires two detent ball assemblies per jaw, each consisting of ball, leaf spring retainer, screw and washer.

One of the major modes of insert failure is chipping of the surface of the insert. More precise mating of the insert with the bottle finish ensured by the close tolerance machining which is possible with the semicircular design of the insert of the present invention reduces the risk of chipping. The semicircular design of the pocket in which the insert is retained and the semicircular configuration of the insert ensure that the maximum surface contact between jaw and insert is realized. Since the insert contacts a large surface area of the pocket in the jaw and since the insert is held immovably within the pocket by a single insert retaining spring which is positioned at the center of the semicircular pocket, there can be no play between the insert and takeout jaw. Thus abrasion of the bottom surface of the insert caused by such play is eliminated. Precise alignment of the takeout jaws and bottles is thus maintained, reducing damage to bottles and increasing the life of the insert.

Figure 1:
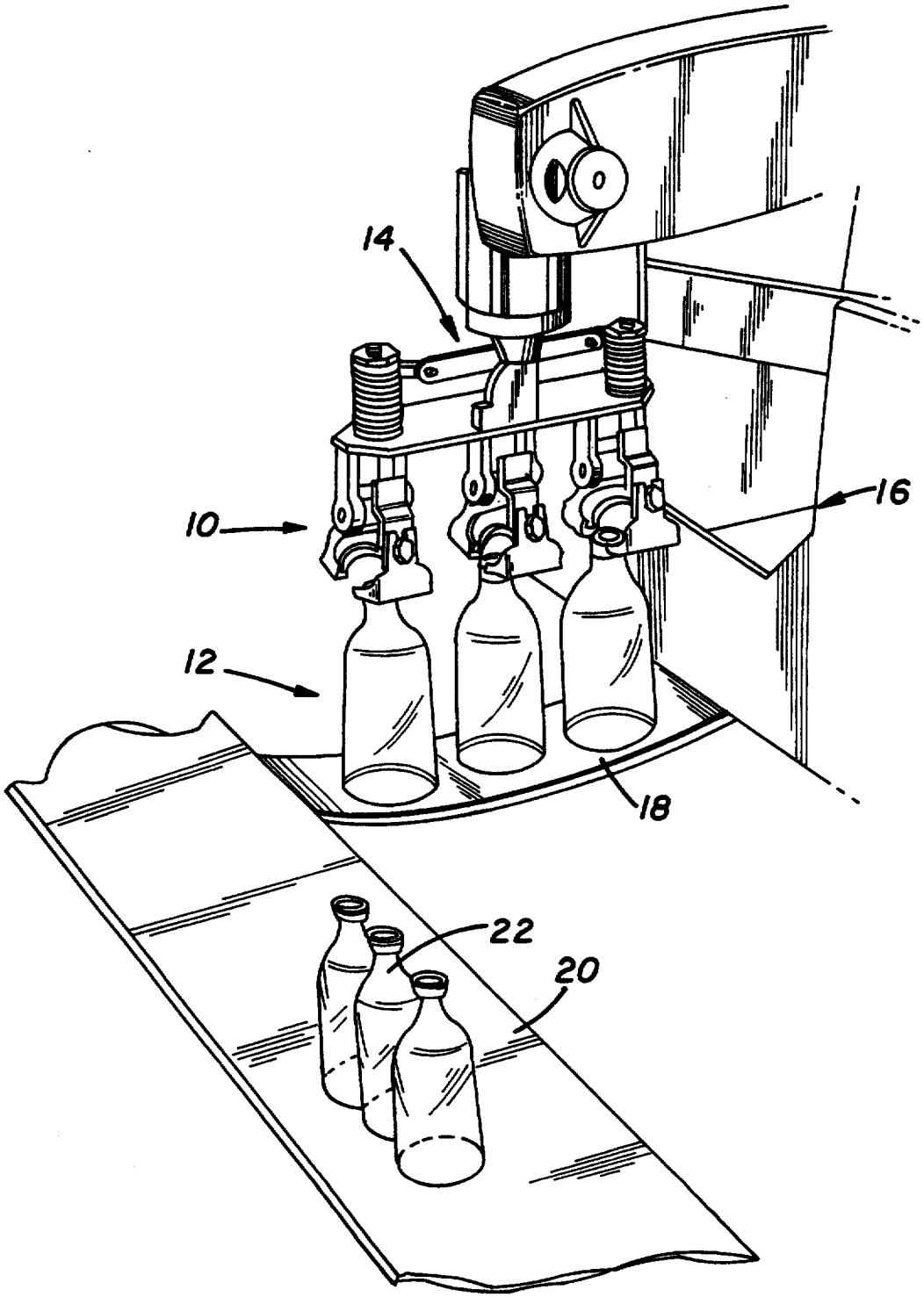
FIG. 1 is a pictorial view of the takeout area of a bottle-making machine showing takeout jaws in position over recently formed glass bottles.

Referring to the drawings, FIG. 1 depicts the environment in which the takeout jaws of the present invention are used. The number 10 represents a series of the takeout jaws of the present invention, which are positioned above a series of hot bottles 12. Takeout jaws 10 are connected to a lifting arm 14. Bottles 12 have just been removed from a bottle forming mold 16 and are suspended just above air pad 18 by a cushion of air, the source of which is not shown. Hot bottles 12, which were red hot when lifted out of the mold by takeout jaws 10, are cooled upon air pad 18 and then transferred to a conveyor belt 20 for transport to an annealing furnace, not shown. Cooled bottles 22 are shown upon conveyor belt 20.

Figure 2:
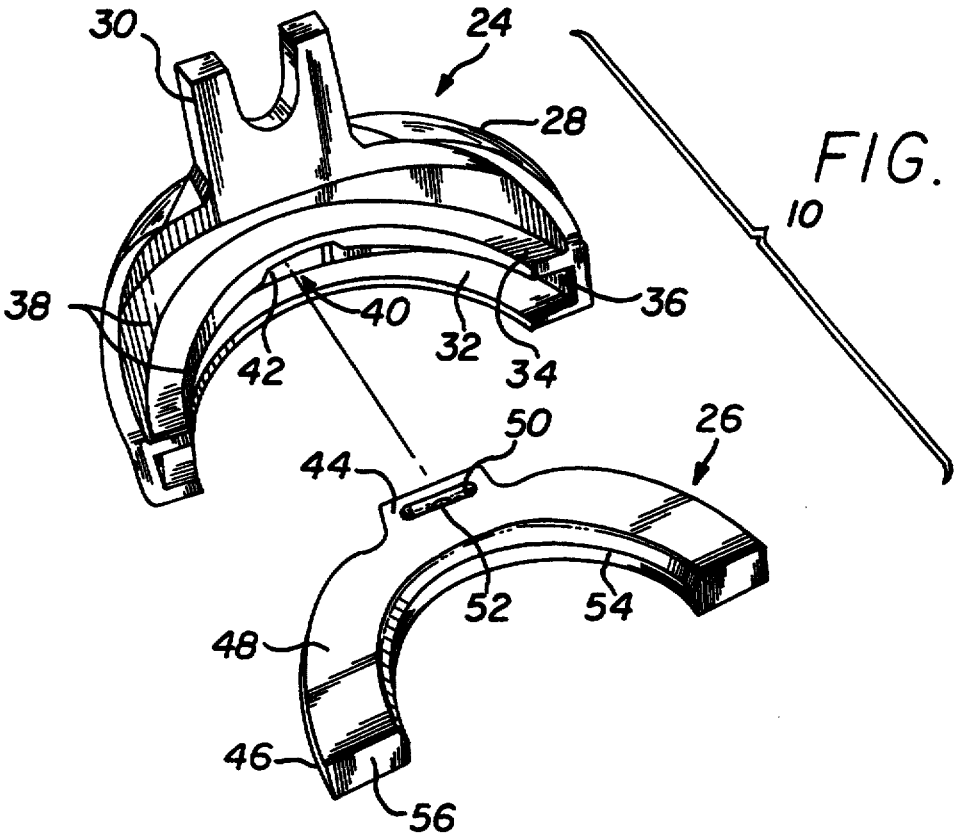
FIG. 2 is a perspective view of a takeout jaw and insert of the present invention showing the insert removed from the jaw.

Referring to FIG. 2, a single takeout jaw 24 is shown along with a mating insert 26. Takeout jaw 24 has a semicircular body 28 and a yoke 30 for attachment to a lifting arm. Body 28 has a base 32 and a shelf 24 which form between them a semicircular pocket 36. Pocket 36 is open at the front and closed at the rear by semicircular back wall 38 of body 28 except for an opening 40 in the center of back wall 38. A center portion 42 in the lower surface of shelf 34 is cut out to provide clearance for a spring clip, not shown. Insert 26 is generally semicircular in form except for a lug 44 formed by cutting notches in the back wall 46 of insert 26. The upper surface 48 of insert 26 has a depression 50 with a hole 52 in the bottom thereof. Hole 52 is used for locating or fixturing purposes in machining insert 26 to the desired dimensions.

The front surface 54 is generally semicircular except for two flat portions 56 at either end of the semicircle. If desired, front surface 54 can be threaded to provide a convenient means for contacting bottles having threaded finishes.

Figure 3:
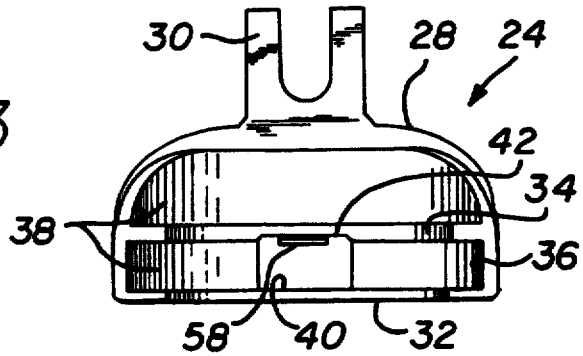
FIG. 3 is a vertical front elevation of a takeout jaw of the present invention with the insert removed.

FIG. 3, in addition to the features described with respect to FIG. 2, has a spring clip 58 shown in opening 40 at center portion 42.

Figure 4:
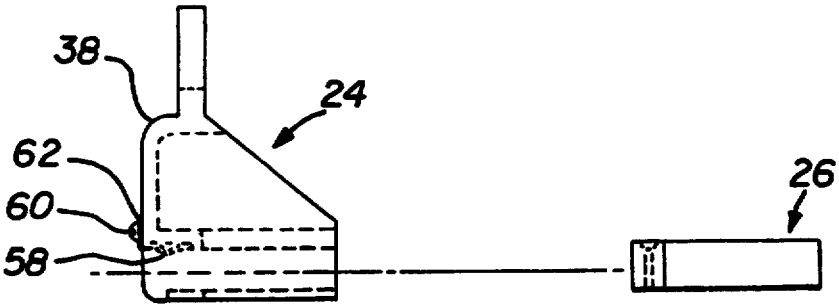
FIG. 4 is a vertical side elevation partly in cross-section of a takeout jaw and insert of the present invention showing the insert removed from the jaw.

FIG. 4 shows the several horizontal surfaces in phantom and also shows that the insert is adapted to be positioned within the pocket in the takeout jaw and that the spring clip and depression in the insert are lined up to be engaged. Spring clip 58 is attached to back wall 38 of takeout jaw 24 by means of a screw 60 and a washer 62.

FIGS. 5, 6, 7 and 8 illustrate how the insert fits within the takeout jaw. As can be seen from these figures, the spring clip is normally untensioned as shown particularly in FIG. 6. As the insert is pushed in the direction shown by arrow 64, the lug 44 engages spring clip 58 and causes it to become tensioned. Then, when the insert is pushed all the way in, spring clip 118 is snapped into depression 50 and becomes untensioned as in FIG. 6. Removal of insert 26 from takeout jaw 24 will then require exertion of a large force to tension spring clip 58 allowing removal of insert 26 from takeout jaw 24.

As pointed out above, graphite is the material of choice for fabricating the takeout jaw inserts of the present invention. Various grades of graphite are commercially available. A particularly desirable material is a fine particle, high strength, isotropic graphite available from POCO Graphite, Inc., a subsidiary of UNOCAL Corporation, Decatur, Texas, which is sold as GLASSMATE® graphite contact material.

While particular embodiments of the invention have been described, it will be understood, of course, that the invention is not limited thereto, since many obvious modifications can be made. It is intended to include any such modifications as will fall within the scope of the appended claims.

We claim:

1. A takeout jaw assembly comprising the combination of (a) a takeout jaw comprising a semi-circular base having a wall having front and rear edges;

a semi-circular shelf perpendicular to said wall, forming a pocket with said base;

a top parallel to said base extending from said wall towards said front edge of said base;

a yoke perpendicular to said top and extending therefrom; and a spring clip attached to the outside of said wall and extending through an opening in said wall formed by cut-outs in said wall, said shelf and said base; and (b) a non-metallic contact material insert comprising a semi-circular body having front and rear edges; and a lug formed at said rear edge of said body by cut-outs therein, said lug having a depression extending substantially parallel to said rear edge of said body;

said spring clip and said depression being in mating relation to retain immovably said insert within said pocket.

2. An assembly according to claim 1 wherein said insert is fabricated of graphite.

3. An assembly according to claim 2 wherein said takeout jaw is fabricated of machined steel.

4. A takeout [jay] *jaw* assembly for handling glass articles comprising:

(a) a semicircular base comprising a wall member having upper and lower, radially inwardly projecting, shelf members, said shelf members and wall member forming a recess;

(b) a substantially semicircular, non-metallic insert located in the recess, said insert having an inwardly projecting edge extending beyond said shelf members for contact with glass articles to be handled; and (c) means for retaining said insert in said recess, said means comprising a spring affixed to the wall member and engaging a surface of the insert.

5. The assembly of claim 4 wherein the insert comprises graphite.

6. The assembly of claim 5 wherein said base is fabricated of machine steel.

7. The assembly of [claim 2] *claim 4* wherein said insert has a depression formed in a surface adjacent a rear edge for receiving said spring.

8. A takeout jaw assembly for grasping glass bottles comprising:

(a) an arcuate base comprising a wall member and radially inwardly extending, substantially parallel, top and bottom shelf members, said shelf members and wall defining a recess;

(b) a semicircular bottle contacting body located in said recess and having a radially inwardly extending edge for contacting said bottles, said body having a depression adjacent a rear edge thereof; and (c) means for retaining said body in said recess, said means comprising a flat spring attached to an outer surface of the wall member, extending through an opening in the wall and having an end for engaging the depression in the contacting body.

9. The assembly of claim 8 wherein the base comprises machine steel.

10. The assembly of claim 9 wherein said semicircular body comprises graphite.

11. The assembly of claim 10 wherein said base further includes a yoke member extending upwardly from said wall for engagement with a lifting means.

12. The assembly of claim 11 wherein said spring is attached to the wall by a threaded fastener.

*13. A takeout jaw insert for handling hot glass articles comprising:*

*a non-metallic body generally in the shape of a semicircular annulus, having a substantially planar upper surface, a substantially planar bottom surface substantially parallel with the upper surface, a curved front surface having a first radius, a curved rear surface having a radius greater than that of the curved front surface in substantially annular relationship with the front surface, and two planar surfaces defining each end of the semicircular annulus, said curved front surface having an inwardly projecting glass contacting edge, said glass contacting edge being precision mateable with a hot bottle, said curved rear surface defining a lug in the curved rear surface, said lug having an elongate depression extending along the upper surface of the graphite body adjacent and tangential to the rear edge.*

*14. The takeout jaw insert of claim 13 wherein the glass contacting edge further comprises helical reliefs for contacting threaded bottles.*

*15. A takeout jaw insert for handling hot glass articles comprising:*

*a non-metallic body generally in the shape of a semicircular annulus, the body having a curved front surface having a first radius, and a curved rear surface having a radius greater than that of the curved front surface in substantially annular relationship with the curved front surface, said curved front surface having an inwardly projecting glass contacting edge, and said rear surface defining a lug in the curved rear surface having an elongate depression extending along an upper surface of the graphite body adjacent and tangential to the rear edge.*

16. A takeout jaw insert for handling hot glass articles comprising:

a generally semicircular non-metallic body in the form of a portion of an annulus, said body having (1) a curved front surface and a curved rear surface, said curved front surface having an inwardly projecting glass contacting edge, and (2) a lug extending radially outwardly from a substantially central portion of said curved rear surface, said lug having a depression therein.

*17. The insert of claim 16 wherein the semicircular body further comprises a substantially planar upper surface and a substantially planar lower surface.*

*18. The insert of claim 16 wherein the body is a substantially rigid, monolithic member, with said depression being in an upper surface of said lug.*

*19. The takeout jaw insert of claim 16 wherein said depression comprises a longitudinal slot in said lug.*

*20. The takeout jaw insert of claim 19 wherein the insert is in the form of a substantially semicircular, annular, rigid, monolithic body terminating in two substantially vertical planar edges which lie at opposite ends of the diameter of said semicircular, annular, rigid, monolithic body, with the depression extending in an upper surface of said lug as a longitudinal slot in a direction parallel to said diameter, said insert having only one said lug centrally*

*located extending radially outwardly from the curved rear surface.*

*21. The takeout jaw insert of claim 16 wherein the insert is in the form of a substantially semicircular, annular, rigid, monolithic body terminating in two substantially vertical planar edges which lie at opposing ends of the diameter of said semicircular, annular, rigid, monolithic body, said body having substantially parallel, horizontally directed, parallel upper and lower surfaces, with the depression extending in an upper surface of said lug as a longitudinal slot in a direction parallel to said diameter.*

*22. A takeout jaw insert for handling hot glass articles comprising:*

*a substantially non-metallic arcuate body having (1) a curved front surface and a curved rear surface, said curved front surface having an inwardly projecting glass contacting edge, and (2) a projection extending from said curved rear surface, said projection having a depression therein.*

*23. The takeout jaw insert of claim 22 being a rigid monolithic portion of an annulus, with said projection extending in a radially outward direction from a substantially central location on said curved rear surface, with said depression being in an upper surface of said projection.*

*24. The takeout jaw insert of claim 23 wherein said depression comprises a longitudinal slot in Said projection.*

*25. The takeout jaw insert of claim 13, 15, 16, 18, 20, 22, or 23 wherein said insert is composed of graphite.*

*26. A takeout jaw assembly for handling hot glass articles, said takeout jaw assembly being comprised of:*

*(i) a holder Comprising a wall with upper and lower shelf members, said wall and shelf members forming a substantially arcuate pocket;*

*(ii) an insert as defined in claim 25 matably fitting in the pocket of said holder so that its glass-contacting edge extends beyond said shelf members for contact with hot glass articles; and*

*(iii) a biased detent, supported by said holder and engaging said insert in the depression of said insert, the detent immovably but releasably retaining said insert in said pocket.*

*27. A takeout jaw assembly for handling hot glass articles, said takeout jaw assembly being comprised of:*

*holder comprising a wall with upper and lower shelf members, said wall and shelf members forming a substantially arcuate pocket;*

*(ii) an insert as defined in claim 13, 15, 16, 20, 22, or 24 matably fitting in the pocket of said holder so that its glass-contacting edge extends beyond said shelf members for contact, with hot glass articles, said insert being a rigid, monolithic body; and*

*(iii) a spring, supported by said holder and operatively engaging said insert in the depression of said insert, for immovably but releasably retaining said insert in said pocket.*

*28. The takeout jaw assembly of claim 27 wherein*

*(1) said insert has a single lug extending radially outwardly from the center portion of said rear surface of said insert,*

*(2) the depression is in an upper surface of the lug, which lug tightly fits into an opening in the wall of the holder,*

*(3) the upper and lower shelf members are substantially horizontally parallel, and*

*(4) the insert is composed of graphite.*

*29. The takeout jaw assembly of claim 28 comprising only one spring for immovably but releasably retaining said insert in said pocket, with said depression being the only depression in the upper surface of the lug.*

*30. A takeout jaw assembly for handling hot glass articles, said takeout jaw assembly being comprised of:*

*(i) holder comprising a wall with upper and lower shelf members, said wall and shelf members forming a substantially arcuate pocket;*

*(ii) an arcuate insert, matably fitting in the pocket of said holder, said insert having an inwardly projecting, substantially arcuate glass-contacting means extending beyond said shelf members for contact with hot glass articles; and*

*(iii) a biased detent, supported by said holder and engaging said insert in a depression in a rear central portion of said insert, the detent immovably but releasably retaining said insert in said pocket.*

*31. The assembly of claim 30 wherein said depression is in a lug that extends radially outwardly from said rear curved surface of said insert, the lug tightly fitting into an opening in a substantially centrally located portion of the wall of said holder, said opening communicating into the arcuate pocket.*

*32. A takeout jaw assembly for handling hot glass articles, said takeout jaw assembly comprising:*

*(i) a holder comprising a wall with upper and lower substantially parallel, horizontally extending shelf members, said wall and shelf members forming a substantially arcuate pocket with the portion of the wall forming the arcuate pocket having an opening therein;*

*(ii) an arcuate graphite insert, with substantially curved front and rear surfaces and substantially planar upper and lower surfaces, matably fitting in the pocket of said holder, said insert having an inwardly projecting, substantially arcuate glass-contacting means extending beyond said shelf members for contact with hot glass articles, and said insert further having a lug projecting radially outwardly from the curved rear surface of said insert, with a depression in said lug, said, lug fitting lightly within said opening in the wall of said holder; and*

*(iii) a single spring, supported by said holder and operatively engaging said insert in the depression of the lug, to immovably but releasably retain said insert in said pocket.*

*33. The assembly as in any one of claims 30–32, inclusive, wherein said insert is a substantially semi-circular, rigid, monolithic, graphite body, with said lug being centrally located on the rear curved surface of the graphite body, with said depression being centrally located in said lug.*

*34. A takeout law assembly for handling hot glass articles comprising:*

*(a) graphite body generally in the shape of a semicircular annulus having upper and lower planar surfaces, the body having a curved front surface and a rear surface having curved in portions of greater radius than the curved front surface in substantially concentric relationship therewith, said curved front surface having an inwardly projecting glass contacting edge, said body further having a lug extending outwardly from a central region of said rear surface with a depression in one planar surface of said lug;*

*(b) an arcuate holder comprising a wall member and radially inwardly extending, substantially parallel, top and bottom shelf members, said shelf members and said wall member defining a generally semicircular recess shaped to receive said graphite body in gen-*

*erally concentric relation with its rear surface contacting said wall member and said glass contacting edge spaced outside said recess, said wall member including a centrally located opening sized to receive said lug; and*

(c) *a biased detent connected to said arcuate holder extending into said depression to firmly secure said graphite body within said recess when said lug is positioned within said opening in said wall member.*

*35. The takeout jaw assembly of claim 34 wherein*

(*1*) *said insert has a single, lug extending outwardly from the center portion of said rear surface of said graphite body,*

(*2*) *the depression comprises a longitudinal slot in an upper surface of the lug, which lug tightly fits into the opening in the wall member, and*

(*3*) *the graphite body is a substantially rigid, semicircular, monolithic body.*

*36. The takeout jaw assembly of claim 35 wherein the body generally in the shape of a semicircular annulus terminates in two substantially vertical planar edges which lie at opposing ends of the diameter of the semicircle.*

37. The takeout jaw assembly of claim 36 wherein the depression comprises a longitudinal slot extending in an upper surface of the lug in a direction parallel to the diameter of said semicircle.

*38. The takeout law assembly as in any one of claims 34–37, inclusive, having only one biased detent for firmly securing said graphite body within said recess.*

* * * * *

UNITED STATES PATENT AND TRADEMARK OFFICE

CERTIFICATE OF CORRECTION

PATENT NO. : Re. 34,953

DATED : May 30, 1995

INVENTOR(S) : Denney et al.

It is certified that error appears in the above-indentified patent and that said Letters Patent is hereby corrected as shown below:

Column 6, claim 20, line 64, delete "*opposite*" and replace with -- *opposing* --.

Column 7, claim 27, line 45, before "*holder*" insert -- *(i) a* --.

Column 8, claim 30, line 5, after "*(i)*" insert -- *a* --.

Column 8, claim 32, line 40, after "*said*" delete "," and after "*fitting*" delete "*lightly*" and replace with -- *tightly* --.

Column 8, claim 34, line 52, after "*takeout*" delete "*law*" and replace with -- *jaw* --; line 54, after "*(a)*" insert -- *a* --; line 57, after "*curved*" delete "*in*".

Column 9, claim 35, line 14, after "*single*" delete ","

Column 10, claim 38, line 14, delete "*law*" and replace with -- *jaw* --.

Signed and Sealed this

Third Day of October, 1995

*Attest:*

Bruce Lehman

BRUCE LEHMAN

*Attesting Officer*

*Commissioner of Patents and Trademarks*